(12) United States Patent
Janzen

(10) Patent No.: US 10,393,309 B2
(45) Date of Patent: Aug. 27, 2019

(54) DEVICE FOR FASTENING ACCESSORY PARTS TO A FURNITURE COMPONENT OF A PIECE OF FURNITURE

(71) Applicant: Grass GmbH, Höchst (AT)

(72) Inventor: Jörg Janzen, Lustenau (AT)

(73) Assignee: Grass GmbH, Höchst (AT)

( * ) Notice: Subject to any disclaimer, the term of this patent is extended or adjusted under 35 U.S.C. 154(b) by 0 days.

(21) Appl. No.: 15/255,498

(22) Filed: Sep. 2, 2016

(65) Prior Publication Data
US 2017/0065081 A1    Mar. 9, 2017

(30) Foreign Application Priority Data
Sep. 4, 2015   (DE) .................... 20 2015 006 277 U

(51) Int. Cl.
| | |
|---|---|
| A47B 88/43 | (2017.01) |
| F16M 13/02 | (2006.01) |
| A47B 88/407 | (2017.01) |
| E05F 5/02 | (2006.01) |
| A47B 95/00 | (2006.01) |
| A47B 88/483 | (2017.01) |

(52) U.S. Cl.
CPC ........... *F16M 13/02* (2013.01); *A47B 88/407* (2017.01); *A47B 88/43* (2017.01); *A47B 88/483* (2017.01); *A47B 95/00* (2013.01); *E05F 5/02* (2013.01); *E05Y 2900/20* (2013.01)

(58) Field of Classification Search
CPC ....... A47B 88/10; A47B 88/473; A47B 88/43; A47B 88/407; A47B 88/044; A47B 88/12; E05F 5/02; E05F 3/02; E05F 3/04; E05Y 2900/20
See application file for complete search history.

(56) References Cited

U.S. PATENT DOCUMENTS

| | | | | |
|---|---|---|---|---|
| 6,015,199 A | * | 1/2000 | Netzer ................. | A47B 88/493 312/334.46 |
| 7,213,896 B2 | * | 5/2007 | Chi ...................... | F16C 29/048 312/334.8 |
| 9,039,109 B2 | * | 5/2015 | Salice .................. | A47B 88/16 312/334.44 |
| 2004/0222723 A1 | * | 11/2004 | Fitz ..................... | A47B 88/467 312/334.6 |
| 2007/0046159 A1 | | 3/2007 | Hoffman | |
| 2008/0303395 A1 | * | 12/2008 | Chen ................... | A47B 88/493 312/334.8 |

(Continued)

FOREIGN PATENT DOCUMENTS

| | | |
|---|---|---|
| DE | 202009003045 U1 | 7/2010 |
| DE | 10201000279 A1 | 8/2011 |

(Continued)

OTHER PUBLICATIONS

Search Report in corresponding European Patent Application No. 16185177.9, dated Feb. 7, 2017, with English translation.

*Primary Examiner* — Nkeisha Smith
(74) *Attorney, Agent, or Firm* — Edell, Shapiro & Finnan LLC

(57) ABSTRACT

A device for fastening accessory parts to a furniture component of a piece of furniture comprises an accessory carrier having at least one mounting interface for fastening, without a tool, to the furniture component and at least one fastening interface for fastening accessory parts to the accessory carrier.

12 Claims, 3 Drawing Sheets

(56) References Cited

U.S. PATENT DOCUMENTS

| | | | |
|---|---|---|---|
| 2010/0045153 A1* | 2/2010 | Ritter | A47B 88/493 |
| | | | 312/334.1 |
| 2012/0145845 A1 | 6/2012 | Hightower | |
| 2014/0009054 A1* | 1/2014 | Salice | A47B 88/16 |
| | | | 312/334.44 |
| 2014/0015392 A1* | 1/2014 | Salice | A47B 88/12 |
| | | | 312/334.44 |
| 2016/0319582 A1* | 11/2016 | Grabher | E05F 5/003 |
| 2017/0265644 A1* | 9/2017 | Fischer | E05F 1/16 |

FOREIGN PATENT DOCUMENTS

| | | |
|---|---|---|
| DE | 202013007519 U1 | 9/2013 |
| WO | 2010011822 A1 | 1/2010 |

\* cited by examiner

DEVICE FOR FASTENING ACCESSORY PARTS TO A FURNITURE COMPONENT OF A PIECE OF FURNITURE

CROSS REFERENCE TO RELATED APPLICATIONS

This application claims foreign priority under 35 U.S.C. § 119(a)-(d) to German Application No. 20 2015 006 277.6 filed on Sep. 4, 2015, the entire contents of which are hereby incorporated by reference.

FIELD OF THE INVENTION

The invention relates to a device for fastening accessory parts to a furniture component of a piece of furniture.

BACKGROUND

Accessory parts for furniture components of furniture have been known for a long time. For example, it is known to equip pull-out guides for moveable furniture parts, for example, drawers with a so-called self-retracting device, which has the effect that after a certain closing travel of the moveable furniture part the moveable furniture part automatically retracts into the closing position. Furthermore, there exist damping devices that are used to damp the opening and/or closing position of the moveable furniture part. Ejection devices for moveable furniture parts are also known, for example, in the form of so-called touch-latch units, which achieve an automatic ejection over a defined ejection path when the moveable furniture part is over-pressed inwardly in the closed position. Such accessory parts, in particular, the aforementioned, are usually fastened to the guides or, more specifically, to mounting angle brackets. In particular, they are screwed or welded to said mounting angle brackets. However, this task is usually time consuming.

SUMMARY

Therefore, the object of the present invention is to provide a device, which is intended for fastening accessory parts to a furniture component of a piece of furniture and with which accessory parts can be fastened to the associated furniture component of the piece of furniture in an easy and cost effective way.

The inventive device for fastening accessory parts to a furniture component of a piece of furniture comprises an accessory carrier, which has at least one mounting interface for fastening without a tool to the furniture component and at least one fastening interface for fastening accessory parts to the accessory carrier.

As a result, it is possible to dispense with the time and effort required to fasten each accessory part individually to the associated furniture component. It is only necessary to fasten the accessory carrier to the associated furniture component, a task that can be performed without a tool and, therefore, easily and quickly. Then at least one accessory part can be fastened quickly and easily to the accessory carrier by means of at least one fastening interface. Expediently the accessory carrier has a plurality of fastening interfaces, so that a plurality of accessory parts can be fastened to said accessory carrier. If there is a plurality of fastening interfaces, then it is possible to populate all of the fastening interfaces with accessory parts or, depending on the specific requirement, only the respective fastening interfaces required for the associated accessory part.

For example, it is possible to fasten different kinds of accessory parts to one and the same fastening interface. For example, it is possible that all of the accessory parts have identical connecting points, which fit on the connecting point on the accessory carrier. However, as an alternative, it is also possible to provide a plurality of individual fastening interfaces, on which then a very specific accessory part has to be mounted.

In a further development of the invention the accessory carrier is designed as a flat body. For example, the accessory carrier can be configured in the manner of a plate. The embodiment of the accessory carrier as a flat body offers the advantage that it has a relative low profile and can, therefore, be fastened to the furniture component in a space saving manner.

In a particularly preferred manner the mounting interface and the fastening interface are arranged on the same side of the accessory carrier. It is expedient for the fastening interface and the mounting interface to be on a top side of the accessory carrier. In particular, the fastening interfaces are then easily accessible on said top side, in order to populate with the associated accessory parts. However, as an alternative, it is conceivable that the mounting interface and the fastening interface are arranged on different sides of the accessory carrier.

In a further development of the invention the mounting interface has first and second holding mechanisms, by which the accessory carrier is held on the associated mounting section of the furniture component in such a way that said accessory carrier can be disconnected. Preferably the first and second holding mechanisms form a form fit with the associated mounting section. Therefore, in particular, the accessory carrier is held at the mounting section in a positive locking manner.

Expediently the first and second holding mechanisms overlap the associated mounting section on the furniture component.

In a further development of the invention the first and second holding mechanisms are opposite each other and define between themselves a receiving space, which extends in a longitudinal direction of the accessory carrier, for the associated mounting section on the furniture component.

The first holding mechanism may have a holding recess, which extends in the longitudinal direction of the accessory carrier, in order to receive a free end of the mounting section. The holding recess may be formed at the same time that the accessory carrier is manufactured.

The second holding mechanism may have a holding projection, which points in the direction of the first holding mechanism and which overlaps a free end of the mounting section.

As a result of the aforesaid, it is possible to carry out an easy and fast disconnect of the accessory carrier from the mounting section. Once the accessory carrier has been disconnected, the spring element snaps back into its starting position, a feature that is advantageous, especially when fastening the accessory carrier to the mounting element, because, after previous widening of the receiving space and insertion of the mounting section, the accessory carrier is held automatically on the associated mounting section. The spring element may be, for example, a tension spring element, which is tensioned when the receiving space is widened.

In a further development of the invention the accessory carrier has a slot, which extends transversely to the longitudinal extent of the receiving space and is open towards an edge side of the accessory carrier and which divides the accessory carrier into a first and a second carrier part, where in this case the carrier parts can be moved relative to each other in such a way that the distance between the two holding mechanisms for purposes of mounting the accessory carrier on the associated mounting section can be enlarged with simultaneous widening of the slot.

It is particularly preferred that the spring mechanism, having a spring force that acts against the widening of the slot, is arranged in the slot. This arrangement makes possible a fast and easy mounting or removal of the accessory carrier on or from the associated mounting section, because once the spreading force has been removed, the spring mechanism snap automatically back again into their starting position, so that the first and second holding mechanisms start to function and provide the hold of the accessory carrier on the mounting section.

It is particularly preferred that the spring mechanism is integrally connected to the carrier parts. The spring mechanism may have at least one leaf spring that is designed, in particular, in the manner of a loop.

In a further development of the invention the fastening interface has at least one fastening opening, which is configured, in particular, as a break-through, for an associated accessory part. In this case it is possible to fasten, for example, as a counterpart, an accessory part, which is provided with a connecting point that projects into the fastening opening.

In a further development of the invention, the accessory carrier has a control element, which is designed, in particular, in the manner of a web having a bottom side, on which a transversely extending control surface is formed, on which a functional element, which interacts with the accessory carrier and is assigned to a moveable furniture component, can be guided.

It is possible that a damping unit, in particular, for damping the opening and/or closing movement of a moveable furniture component is fastened to the fastening interface.

In a further development of the invention the fastening interface has a guide strip, on which the damping unit is moveably guided.

In a particularly preferred manner the accessory carrier is made of a synthetic plastic material, in particular, it is formed as a plastic injection molding.

The guide device may have at least one guide unit, which has a body rail, which can be fastened to the furniture body by at least one mounting angle bracket, and at least one rail, which is connected to the moveable furniture part and which is mounted in a manner allowing a relative movement in relation to the body rail, where in this case the mounting angle bracket has a mounting section, on which the accessory carrier is mounted.

BRIEF DESCRIPTION OF THE DRAWINGS

Preferred exemplary embodiments of the invention are shown in the drawings and are explained in greater detail below. The drawings show in.

DETAILED DESCRIPTION

Figure 1:
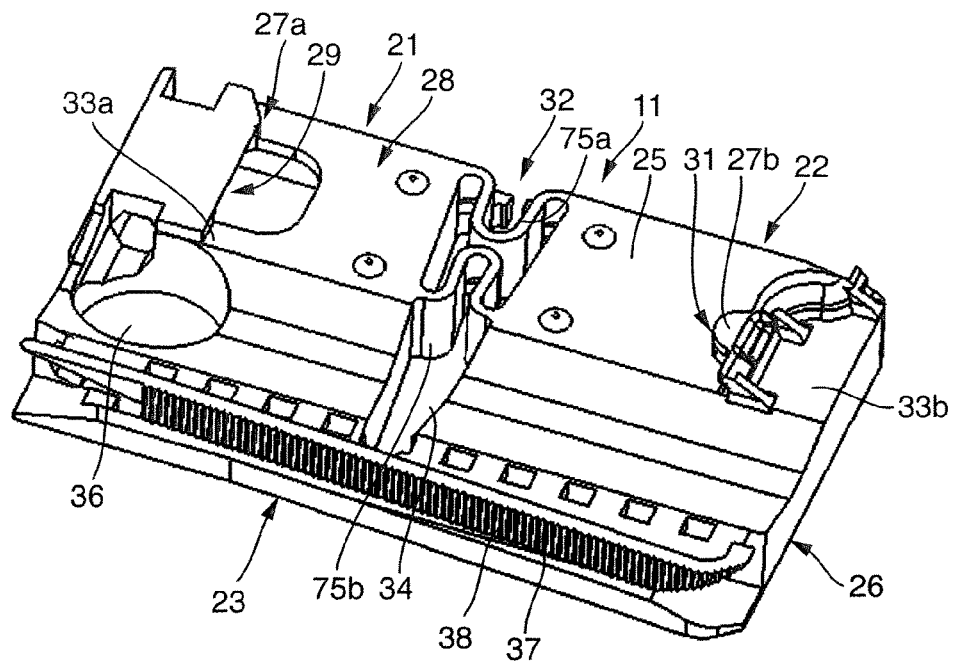
FIG. 1: a perspective representation of a first exemplary embodiment of the device according to the invention.

FIGS. 1 to 4 show a first exemplary embodiment of the inventive device for fastening accessory parts to a furniture component 12 of a piece of furniture 10. The device 11, which is shown merely for illustrative purposes, is fastened here to a component of a guide device 13 for guiding a moveable furniture part in the form of a drawer 801. Of course, it is also possible to fasten the device 11 to other furniture components of furniture 10, for example, non-movable furniture parts.

However, the inventive device 11 is explained below using the case, in which said inventive device is fastened to a guide device 13 of a drawer 801, as an example. The drawer 801 is displaceably mounted relative to a furniture body (not shown) by means of the guide device 13. The guide device 13 comprises a plurality of guide units 14, of which two guide units are assigned to side edges of the drawer 801 that are opposite each other. In the drawing just a single guide unit 14 is shown, but the other guide unit 14, which is assigned to the opposite side edge of the drawer 801, is constructed in the same way.

Each of the guide units 14 has a body rail 15, which can be configured, for example, as a bent-over sheet metal component.

Figure 4:
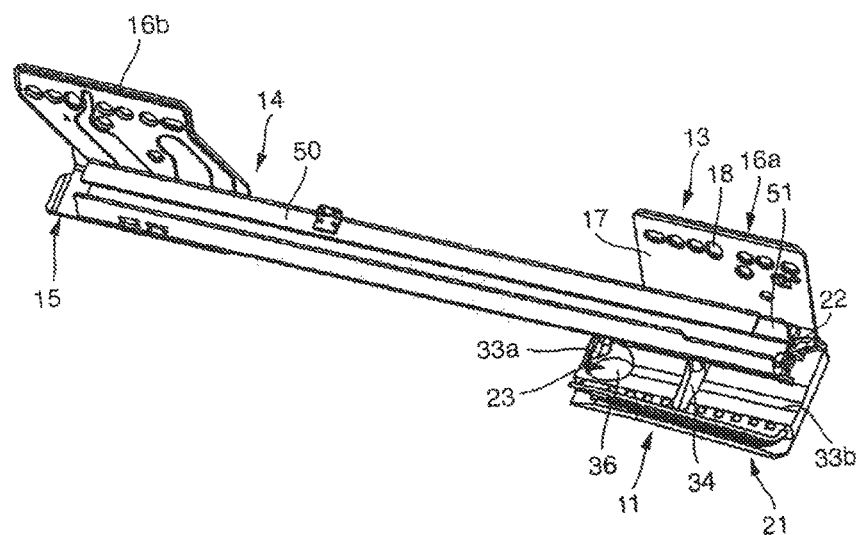
FIG. 4: a perspective view of the device from FIG. 3, where in this case a guide device is shown as the furniture component of a piece of furniture.

As shown, in particular, in FIG. 4, the body rail 15 has a plurality of mounting angle brackets 16a, 16b, which are arranged one after the other in succession in the longitudinal direction of the body rail 15.

Figure 3:
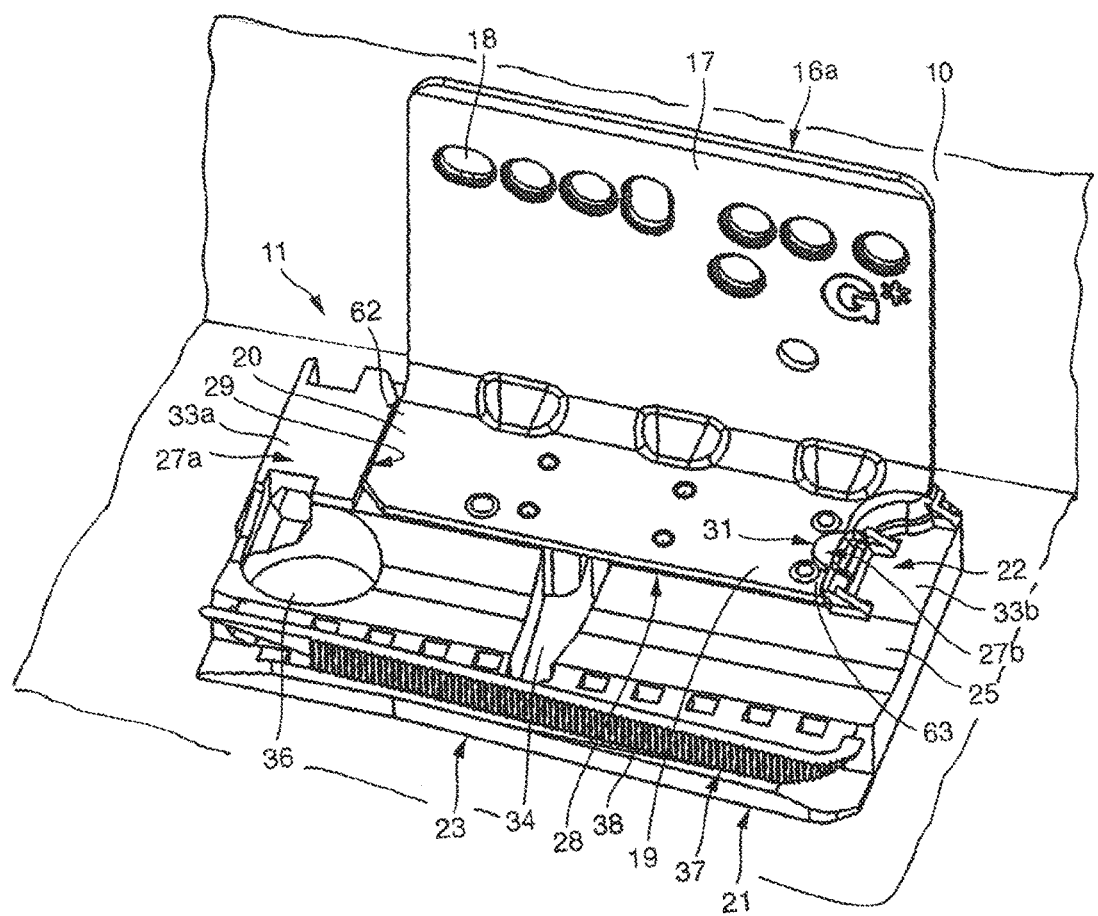
FIG. 3: a perspective representation of the device from FIG. 1, mounted on an associated furniture component of a piece of furniture.

As shown, in particular, in FIG. 3, each of the mounting angle brackets 16a, 16b has a mounting leg 17, which has a plurality of fastening holes 18, which are arranged, for example, one after the other in rows. These fastening holes can be used to fasten the mounting angle bracket 16a, 16b with the aid of a suitable fastener, for example, screws, to an associated side wall of a drawer holder (not depicted), which is designed in the furniture body, in such a way that the mounting angle bracket is fixed in position.

Each of the mounting angle brackets 16a, 16b has a functional leg 19, which projects at an angle, in particular, at right angles from the mounting leg 17 and on which there is a mounting section 20, to which the device 11 can be fastened.

On the functional leg 19 of the body rail a running rail, which is also a part of the guide unit 14, in the form of a rail 15 of a furniture part, which is referred to hereinafter as the drawer rail, is displaceably guided by a bearing mechanism (not shown). Rolling bodies, in particular, rollers, which are disposed in running carriages and which run along on a guide track, formed on the body rail 13, are used as the bearing mechanism. The drawer rail is assigned to the drawer and extends below the drawer bottom in the depth direction.

In addition to the rail 50 of the furniture part and the body rail 15, it is also possible to provide a central rail 51, which is guided, on the one hand, moveably on the body rail 15 and, on the other hand, is mounted on the drawer rail in a manner allowing movement. Therefore, the central rail 51 acts between the drawer rail and the body rail 13.

Figure 2:
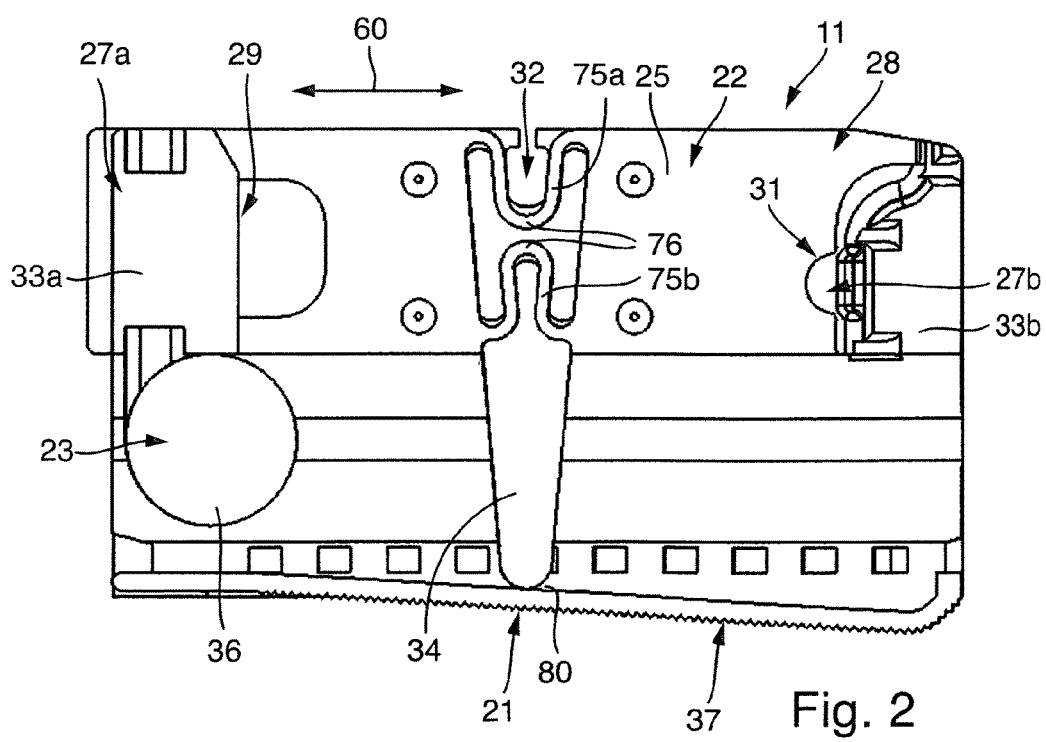
FIG. 2: a plan view of the device from FIG. 1.

As shown, in particular, in FIGS. 1 and 2, the device 11 has an accessory carrier 21, which has at least one mounting interface 22 for fastening without a tool to the furniture component and at least one fastening interface 23 for fastening the accessory parts to the accessory carrier 21.

As shown, in particular, in FIG. 1, the accessory carrier 21 is designed as a flat body, for example, in the form of a carrier plate. The accessory carrier 21 is made expediently of a synthetic plastic material. It is advantageous if the accessory carrier 21 is a plastic injection molding, so that it can be reproduced repeatedly and can be manufactured in a simple and cost effective way.

The accessory carrier 21 has a top side 25 and a bottom side 26, which is opposite said top side. In the illustrated example, the mounting interface 22 and the fastening interface 23 are on the top side 25 of the accessory carrier 21. Of course, it is possible to design the mounting interface 22 and the fastening interface 23 on different sides of the accessory carrier 21.

However, in the case of the example the mounting interface 22 is on the top side 25 of the accessory carrier 21. The mounting interface 22 has first and second holding mechanisms 27a, 27b, by which the accessory carrier 21 can be detachably fastened to the mounting section 20 of the functional leg 19 of the associated mounting angle bracket 16a.

In the mounted state of the accessory carrier 21 the first and second holding mechanisms 27a, 27b overlap the mounting section 20 on the functional leg 19 of the mounting angle bracket 16a. The first and second holding mechanisms 27a, 27b are opposite each other and define a receiving space 28, which extends in the longitudinal direction 60 of the accessory carrier 21, for the functional leg 19.

The first holding mechanism 27a has a holding recess 61, which extends in the longitudinal direction 60 of the accessory carrier 21. The free cross section of the holding recess 61 is larger than the cross section of the functional leg 19, so that a first free end 62 of the functional leg 19 can be inserted into the holding recess 61. As shown, in particular, in FIG. 1, the holding recess 61 is defined by the wall sections in the transverse direction of the accessory carrier, so that the accessory carrier is secured in the transverse direction, which has the effect that the accessory carrier 21 can be prevented from being moved away from the functional leg 19 as a result of a simple transverse movement.

The second holding mechanism 27b has a holding projection, which points in the direction of the first holding mechanism 27a and which is configured to be curved, for example, in the manner of a semi-circle (FIGS. 1 and 2). In this case the counterpart to the holding recess 61 of the first holding mechanism 27a is a receiving slot 31, which extends in the manner of a semi-circle and is formed between the bottom side of the holding projection and the top side 25 of the accessory carrier 21, in order to receive a second free end 63 of the functional leg 19. In contrast to the holding recess 61 on the first holding mechanism 27a, a lateral guide of the functional leg 19 is not provided here.

As shown, in particular, in FIG. 2, the accessory carrier 21 has a slot 34, which extends transversely to the longitudinal extent of the receiving space 28 and which is open towards a longitudinal side of the accessory carrier. The slot 34 is molded at the same time that the accessory carrier, which is made of a synthetic plastic material, is manufactured as a result of a suitable removal from the mold. The slot 34 diverges towards the longitudinal side of the accessory carrier 21. In other words, the slot width of the slot 34 becomes larger towards the longitudinal side of the accessory carrier 21.

The slot 34 divides the accessory carrier into a first and second carrier part 33a, 33b. The two carrier parts can be moved relative to each other in such a way that the distance between the two holding mechanisms 27a, 27b for mounting the accessory carrier on the associated mounting section 20 can be enlarged with simultaneous widening of the slot 34. The two carrier parts 33a, 33b are moveably connected to each other by a solid hinged joint 80 at the base of the slot 34.

The spring mechanism 32, which has a spring force that acts against the widening of the slot 34, is disposed in the slot 34. As shown, in particular, in FIG. 2, the spring mechanism 32 is integrally connected to the two carrier parts 33a, 33b. In the case of the example the spring mechanism 32 comprises two leaf springs 75a, 75b, which are designed in the manner of a loop and which are integrally molded at one end to one carrier part and at the other end to the other carrier part 33a, 33b. Each of the leaf springs 75a, 75b has a loop section 76, which is approximately in the center of the slot 34 in the direction of the slot width. The loop sections 76 of the leaf springs 75a, 75b face each other.

In the example described, the fastening interface 23 is also on the top side 25 of the accessory carrier 21. In the case of the example the fastening interface 23 comprises a particularly circular fastening opening in the form of a break-through 36, which extends, therefore, from the top side 25 through the accessory carrier 21 and opens out on the bottom side 26. In this break-through 36 it is possible to fasten an accessory part (not shown), which has, for example, a connecting point, which is designed in the manner of a pin and which is adapted to the shape of the break-through 36.

Furthermore, the fastening interface 23 comprises a control element 37, which is designed in the manner of a web having a bottom side, on which a transversely extending control surface 38 is formed, on which a functional element 90, which interacts with the accessory carrier 21 and which is assigned to the drawer 801, can be guided. As the functional element 90, it is possible to employ, for example, a catch device, which is fastened to the drawer 801 and which is guided by the control surface 38 that is formed on the control element 37, in such a way that despite the different tilts with respect to the associated guide unit, the drawer 801 is captured and subsequently guided.

In order to fasten the accessory carrier 21 to the associated mounting section 20 on the functional leg 19 of the associated mounting angle bracket 16a, the accessory carrier 21 is first spread apart by pressing the two carrier parts 33a, 33b away from each other against the spring force of the leaf springs 75a, 75b, as a result of which the loop sections 76 are bent upwards. As the next step the first holding mechanism 27a is pushed with the holding recess 29 onto the free end of the functional leg 19, as a result of which said functional leg dips into the holding recess 29. Then as the next step the accessory carrier 21 can be swung in, so that the opposite other free end 63 of the functional leg 19 moves in under the holding projection. Then the spreading apart of the two carrier parts 33a, 33b is stopped by letting loose, so that the two carrier parts 33a, 33b snap back again into their original position as a consequence of the spring force of the leaf springs 75a, 75b and, in so doing, simultaneously surround the inserted functional leg 19 on the two opposite holding mechanisms 27a, 27b. At this point the accessory carrier 21 is secured on the associated functional leg 19 and, in particular, in all three spatial directions.

Expediently the accessory parts, which may be, for example, a self-retractor or a damper, have already been previously mounted on the associated fastening interface 23 on the accessory carrier 21. Of course, it is also possible to fasten the accessory parts after the accessory carrier 21 has been mounted on the functional leg 19.

Figure 5:
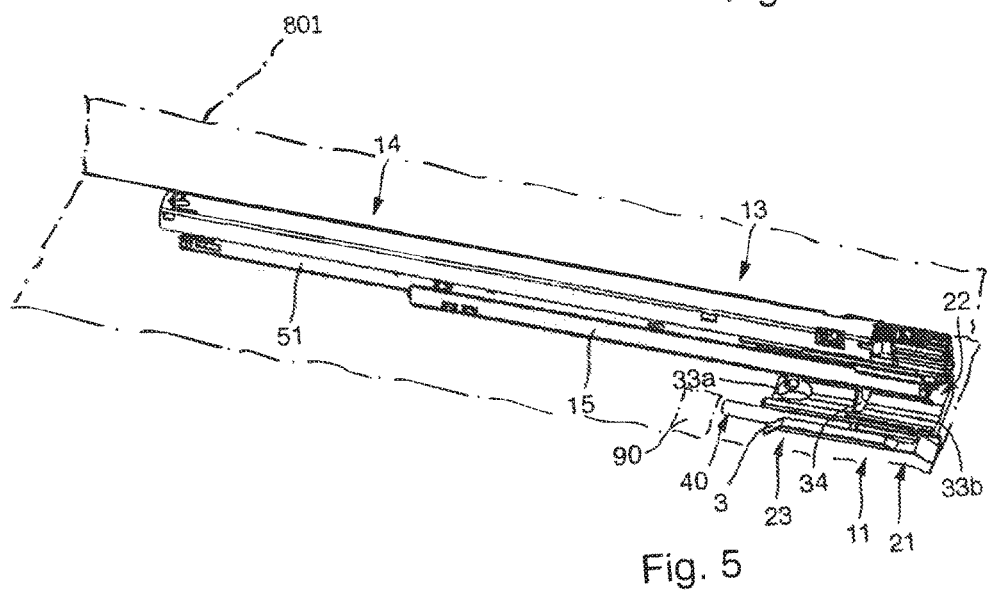
FIG. 5: a second exemplary embodiment of the inventive device, mounted on a furniture component of a piece of furniture that is designed as a guide device.

FIG. 5 shows a second exemplary embodiment of the device 11 according to the invention. The second exemplary embodiment is different from the above described first exemplary embodiment in its different design of the accessory carrier 21. In contrast to the control element 37 with the control surface 38 of the first exemplary embodiment, a guide strip 39 is now designed on the longitudinal side that is opposite the mounting longitudinal side of the accessory carrier 21. As shown, in particular, in FIG. 5, a damper unit 40 is moveably guided on the guide strip 39.

The mounting of the second exemplary embodiment of the accessory carrier 21 is carried out in the same way as the mounting of the accessory carrier 21 of the first exemplary embodiment.

What is claimed is:

1. A device for fastening accessory parts to a furniture component of a piece of furniture, comprising:
    an accessory carrier having at least one mounting interface for fastening without a tool to the furniture component; and
    at least one fastening interface for fastening accessory parts to the accessory carrier,
    wherein the at least one mounting interface on the accessory carrier includes first and second holding mechanisms by which the accessory carrier is configured to be detachably mounted on an associated mounting section of the furniture component, and wherein the first and second holding mechanisms are configured for positive locking with the associated mounting section;
    wherein the first and second holding mechanisms are opposite each other and define between them a receiving space for the associated mounting section of the furniture component, the receiving space extending in a longitudinal direction of the accessory carrier; and
    wherein the accessory carrier has a slot that extends transversely to the longitudinal direction of the receiving space and is open towards an edge side of the accessory carrier and that divides the accessory carrier into first and second carrier parts, wherein the carrier parts are moveable relative to each other such that a distance between the first and second holding mechanisms from the mounting of the accessory carrier on the associated mounting section is enlargeable with simultaneous widening of the slot.

2. The device of claim 1, wherein the accessory carrier is configured as a plate.

3. The device of claim 1, wherein the first and second holding mechanisms are configured to overlap the associated mounting section of the furniture component.

4. The device of claim 3, wherein the first holding mechanism has a holding recess that extends in the longitudinal direction of the accessory carrier for receiving a free end of the associated mounting section.

5. The device of claim 3, wherein the second holding mechanism has a holding projection that points in a direction of the first holding mechanism for overlapping a free end of the associated mounting section.

6. The device of claim 1, further comprising a spring mechanism arranged in the slot and having a spring force that acts against widening of the slot.

7. The device of claim 6, wherein the spring mechanism is integrally connected to the first and second carrier parts, the spring mechanism comprising at least one leaf spring configured as a loop.

8. The device of claim 1, wherein the fastening interface includes at least one fastening opening configured as a break-through for an associated accessory part.

9. The device of claim 1, wherein the accessory carrier includes a control element configured as a web having a bottom side, on which a transversely extending control surface is formed, the device further comprising a functional element, for mounting on a movable furniture part, configured to be guided on the control surface, the functional element interacting with the accessory carrier.

10. The device of claim 1, wherein the accessory carrier comprises an injection-molded synthetic plastic material.

11. The device of claim 1, configured to be fastened to a component of a guide device to movably guide a moveable furniture part comprising a drawer, a door or a flap.

12. The device of claim 11, wherein the device is configured to attach to a mounting section of a mounting angle bracket of the guide device comprising a guide unit, the guide unit further comprising a body rail configured to be fastened to a furniture body by the mounting angle bracket and a running rail connected to the movable furniture part.

* * * * *